(12) United States Patent
Chang

(10) Patent No.: US 9,545,708 B2
(45) Date of Patent: Jan. 17, 2017

(54) PNEUMATIC MOTOR WITH BUILT-IN STRIKER MECHANISM

(71) Applicant: Ching-Shun Chang, Taichung (TW)

(72) Inventor: Ching-Shun Chang, Taichung (TW)

(73) Assignees: Hsiu-Ju Chen, Taichung (TW); Yu-Chin Chen, Taichung (TW)

( * ) Notice: Subject to any disclaimer, the term of this patent is extended or adjusted under 35 U.S.C. 154(b) by 840 days.

(21) Appl. No.: 13/941,923

(22) Filed: Jul. 15, 2013

(65) Prior Publication Data

US 2015/0014010 A1 Jan. 15, 2015

(51) Int. Cl.
| | | |
|---|---|---|
| *B25B 21/02* | (2006.01) | |
| *B25F 5/02* | (2006.01) | |
| *B25F 5/00* | (2006.01) | |
| *B23B 45/04* | (2006.01) | |
| *B25B 21/00* | (2006.01) | |
| *B25D 9/08* | (2006.01) | |
| *B25B 23/145* | (2006.01) | |

(52) U.S. Cl.
CPC .............. *B25B 21/02* (2013.01); *B23B 45/04* (2013.01); *B25B 21/00* (2013.01); *B25B 23/1453* (2013.01); *B25D 9/08* (2013.01); *B25F 5/00* (2013.01); *B25F 5/02* (2013.01)

(58) Field of Classification Search
None
See application file for complete search history.

(56) References Cited

U.S. PATENT DOCUMENTS

| 2,591,323 | A | * | 4/1952 | Webb | B25B 21/00 173/15 |
|---|---|---|---|---|---|
| 2,947,283 | A | * | 8/1960 | Roggenburk | B25B 21/02 173/169 |
| 2,961,903 | A | * | 11/1960 | Roggenburk | B25B 21/02 173/169 |
| 3,169,585 | A | * | 2/1965 | Maurer | B25B 21/02 173/169 |
| 6,648,080 | B1 | * | 11/2003 | Liao | B25B 21/026 173/176 |
| 7,147,063 | B2 | * | 12/2006 | Chen | B25B 21/026 173/93 |
| 7,510,023 | B1 | * | 3/2009 | Cheng | B25B 21/02 173/93 |
| 7,572,119 | B2 | * | 8/2009 | Lin | B23Q 5/06 418/133 |
| 7,594,550 | B2 | * | 9/2009 | Chen | B25B 21/02 173/104 |

(Continued)

*Primary Examiner* — Hemant M Desai
*Assistant Examiner* — Mobeen Ahmed
(74) *Attorney, Agent, or Firm* — Egbert Law Offices, PLLC

(57) ABSTRACT

A pneumatic motor with built-in striker mechanism mainly includes a cylinder, rotor set and output shaft lever. The rotor set has a rotary drum and flexible blades. The output shaft lever can be driven by the rotary drum. A chamber is formed into the rotary drum and a striking portion on the output shaft lever is located within the chamber. The built-in striker mechanism is placed in the chamber and has striking bulges protruded on the striking portion, movable hammers sleeved externally on the striking bulge and struts axially located on the rotary drum. This new pneumatic motor has the striker mechanism set into the rotary drum of the rotor set, thus reducing greatly the axial length and volume of the pneumatic motor and realizing ease-of-use.

5 Claims, 8 Drawing Sheets

(56) References Cited

U.S. PATENT DOCUMENTS

| | | | |
|---|---|---|---|
| 7,607,492 B2* | 10/2009 | Seith | B25B 21/026 173/1 |
| 2010/0101815 A1* | 4/2010 | Kobayashi | B25B 21/004 173/112 |
| 2013/0112449 A1* | 5/2013 | Lu | B25B 21/026 173/126 |
| 2013/0202471 A1* | 8/2013 | Chang | F01C 1/3446 418/105 |
| 2013/0233585 A1* | 9/2013 | Lin | B25F 5/005 173/216 |

* cited by examiner

PNEUMATIC MOTOR WITH BUILT-IN STRIKER MECHANISM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a pneumatic tool structure, and more particularly to an innovative one which is designed into a pneumatic motor with built-in striker mechanism.

2. Description of Related Art Including Information Disclosed Under 37 CFR 1.97 and 37 CFR 1.98

The pneumatic tools, such as pneumatic spanners, are mainly applied, to screwing or loosening of big nuts and screws. As big nuts and screws requite extremely high torque for locking or loosening, relatively high torque required by themselves will be generated. Said pneumatic spanner's torque is often generated by a set of striker mechanism. According to the construction and operating principle of said striker mechanism, two massive hammers are set securely into a hammer holder. Said hammer could generate continuously inertia swinging for enhanced hammering torque along with the clockwise and counterclockwise rotation of a driving shaft.

The following shortcomings are still observed during actual applications:

Said striker mechanism is structured in a way that as front reversing enclosure of certain axial length is set additionally at front end of the pneumatic motor of the pneumatic tool. The front reversing enclosure is used to install and accommodate the hammer holder, massive hammer and rotating shaft of said striker mechanism. However, since the striker mechanism is protruded at the front end of the pneumatic motor, this increases greatly the axial length and volume of the pneumatic tool body, such that the protruding length formed from the end of output shaft to the handle is extended markedly, leading to higher load tier the users and inconvenience in use. As for the manufacturers, the substantial increase of the axial length and volume could results in much higher cost of the materials, manufacturing, assembly and packaging with poorer economic efficiency.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the innovative design of "a pneumatic motor with built-in striker mechanism" of the present invention wherein a chamber is formed in the rotary drum of the rotor set, a striking portion on the output shaft lever is located within the chamber, and the built-in striker mechanism is placed in the chamber, the present invention provides at novel pneumatic motor with a striker mechanism set into the rotor set's rotary drum, thus reducing markedly the axial length and volume of the pneumatic motor. In this way, the protruding length from the output shaft lever's outer shaft end of the pneumatic tool to the handle could be obviously shortened, enabling the users to hold and operate it more easily with better advantages. Moreover, the striker mechanism has advantages such as: direct driving by the rotor set, instant torque lifting and fast unlocking of components, etc; as the striker mechanism is set into the rotary drum of the rotor set, the axial length and volume of the pneumatic motor could be obviously reduced, so the volume of related components could be cut down, thus saving substantially the cost of materials, manufacturing, assembly and packaging with better economic benefits.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

FIGS. 1-4 depict preferred embodiments of the pneumatic motor of the present invention with built-in striker mechanism, which, however, are provided for only explanatory objective. Said motor A for a pneumatic tool is installed, into the main body 12 formed at one end of the handle 11 of a pneumatic tool 10 (at top in this preferred embodiment).

Figure 3:
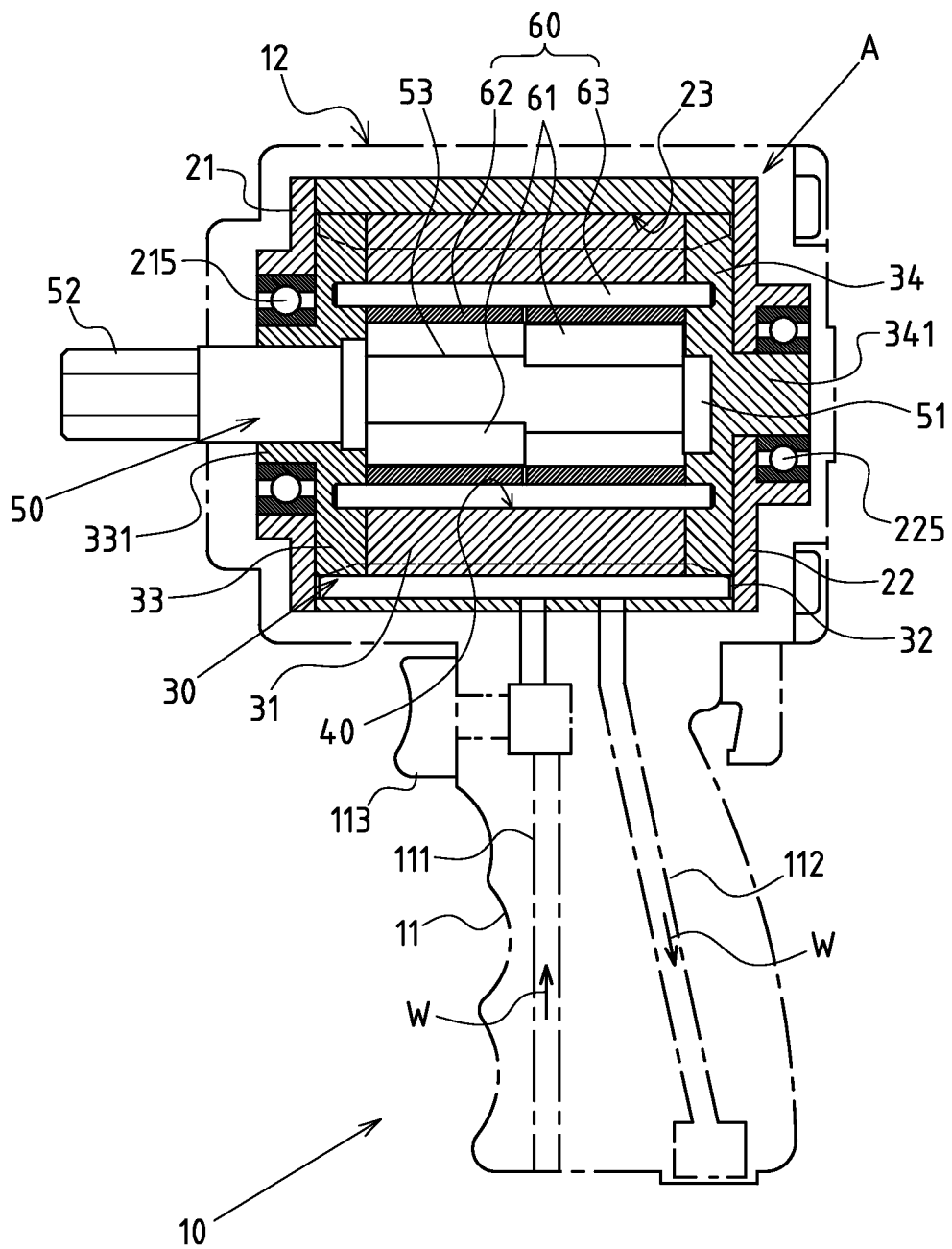
FIG. 3 is a combined plane view (lateral view) of the preferred embodiment of the present invention.
Figure 4:
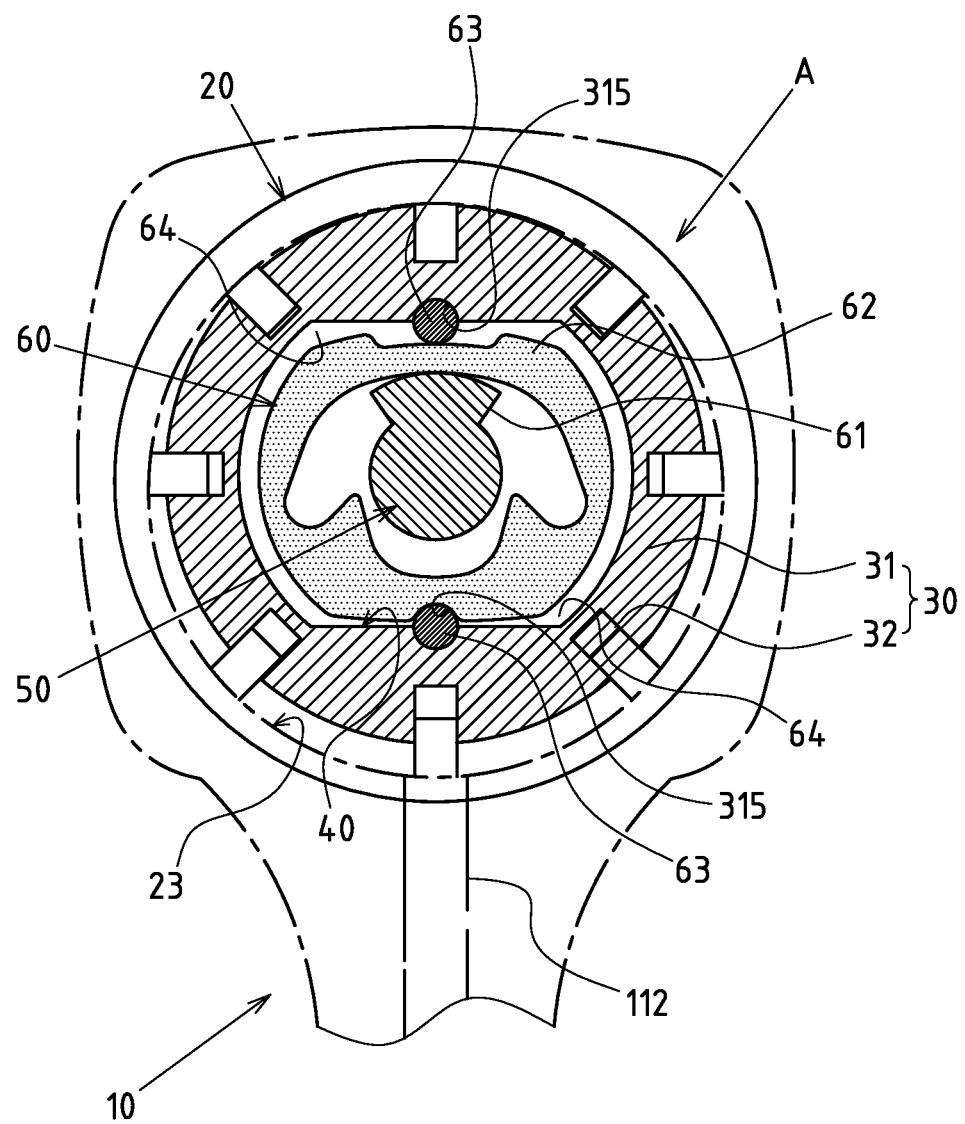
FIG. 4 is another combined plane sectional view (end view) of the preferred embodiment of the present invention.

Referring to FIG. 3, the handle 11 mainly consists of an inlet channel 111, exhaust channel 112 and a switch 113 used to control the on-off state of the inlet channel 111

Said pneumatic motor A comprises a cylinder 20, designed into a hollow casing, and comprising: a front wall 21, a rear wall 22 and a reservoir 23 located internally. The front wall 21 is provided with a front bearing 215, and the rear wall 22 with a rear bearing 225.

A rotor set 30 is rotarily set into the reservoir 23 of the cylinder 20. Said rotor set 30 comprises a rotary drum 31 and multiple flexible blades 32 set at interval on the peripheral wall of the rotary drum 31. Said rotary drum 31 comprises a front panel 33 and a rear panel 34, of which a front convex shaft 331 is set at center of the from panel 33 for screwing onto the front bearing 215, and a rear convex shaft 341 is set at center of the rear panel 34 for screwing onto the rear bearing 225. Moreover, external ends of the flexible blades 32 are shiftably abutted on to inner wall of the reservoir 23.

A chamber 40 is formed into the rotary drum 31 of the rotor set 30. Said chamber 40 is preferably designed into a cylindrical space.

An output shaft lever 50 is provided and comprises a driven end 51, an outer shaft end 52 and a striking portion 53 located between the driven end 51 and the outer shaft end 52. The driven end 51 is located on the rear panel 34 of the rotary drum 31 on the rotor set 30, the output shaft lever 50 could be driven simultaneously with the rotary drum 31. The outer shaft end 52 penetrates the front convex shaft 331 on the front panel 33 of the rotary drum 31, then extends out of the front end of the main body 12 of the pneumatic tool 10. The striking portion 53 is located in the chamber 40 of the rotary drum 31. Of which, the driven end 51 is combined with the rear panel 34 by means of toothed meshing, polygonal insertion or tangential mating.

A built-in striker mechanism 60 is set into the chamber 40 formed by the rotary drum 31 of the rotor set 30, and comprises: at least a striking bulge 61 protruded on the striking portion 53 of the output shaft lever 50, at least a movable hammer 62 sleeved externally on the striking bulge 61 and at least a strut 63 axially located between the front and rear panels 33, 34 of the rotary drum 31 for supporting and limiting the movable hammer 62. The chamber 40 is provided with a relief portion 64 only for the motion of the movable hammer 62 (only marked in FIG. 4).

At least a driving slot 315 (marked in FIGS. 2 and 4) is recessed into at least a lateral wall of the chamber 40 of the rotary drum 31, such that one side of said strut 63 could be inserted and driven simultaneously by the rotary drum 31.

Figure 1:
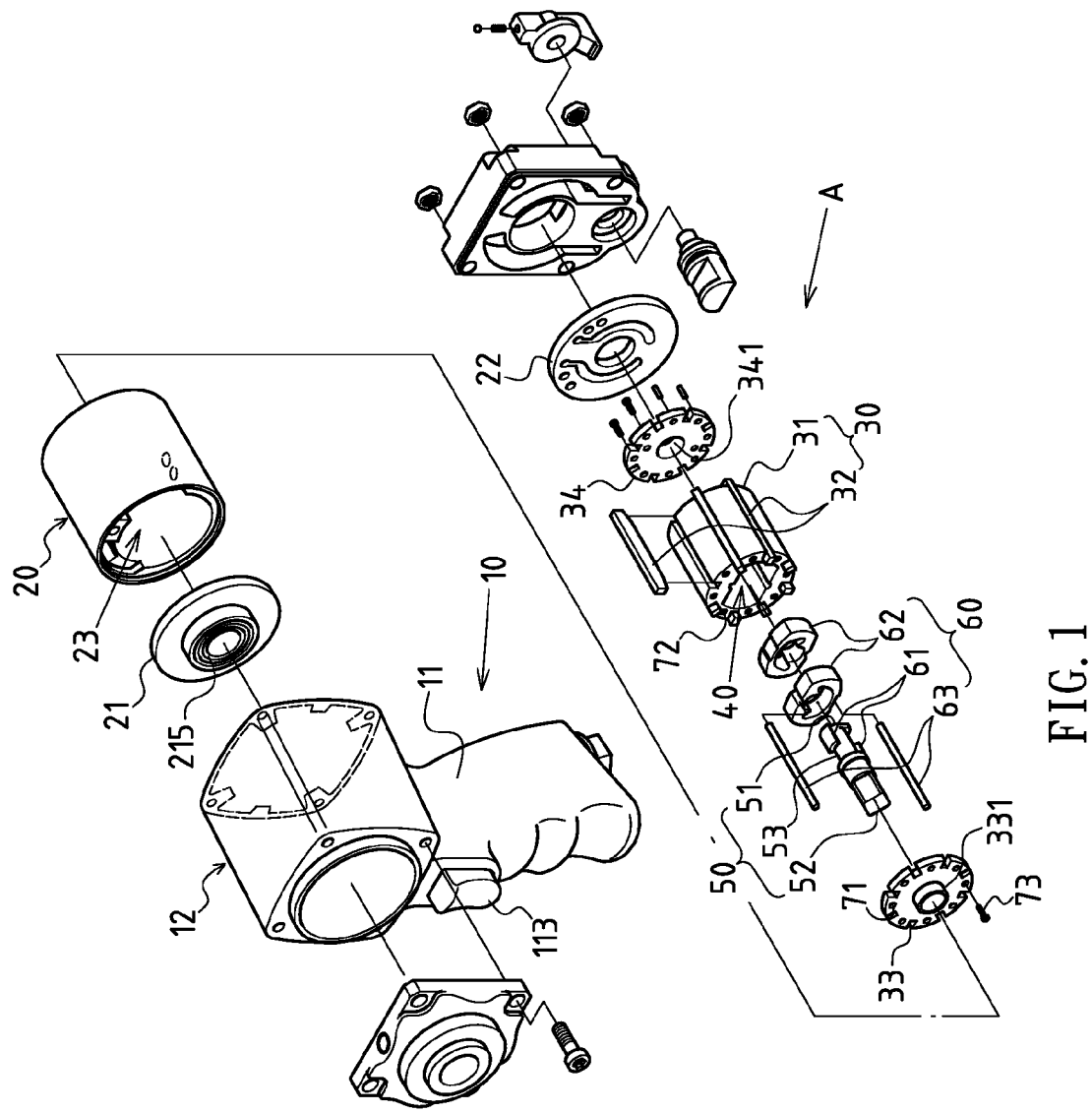
FIG. 1 is an exploded perspective view of preferred embodiment of the present invention.
Figure 2:
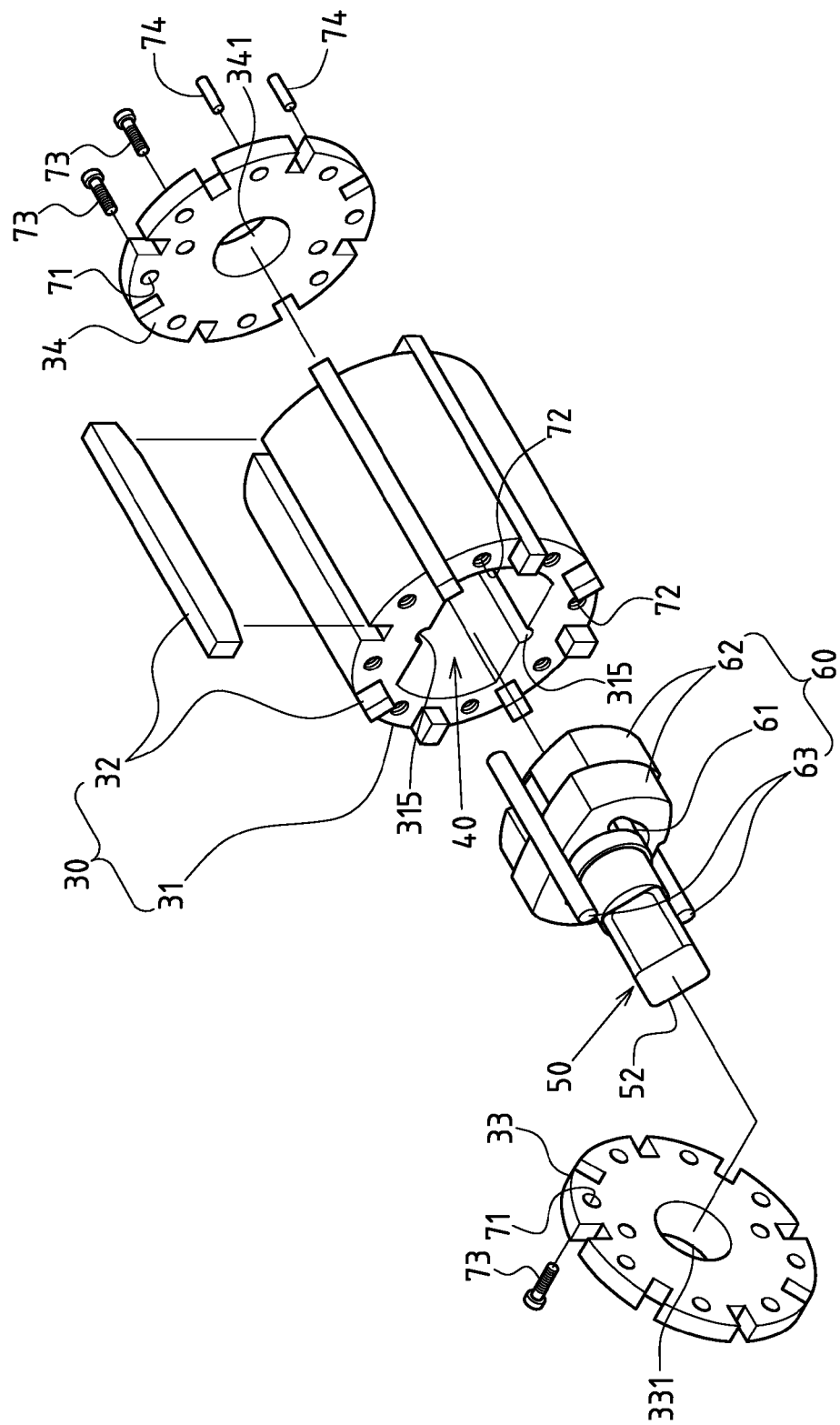
FIG. 2 is another exploded perspective view of the preferred embodiment of the present invention.
Figure 5:
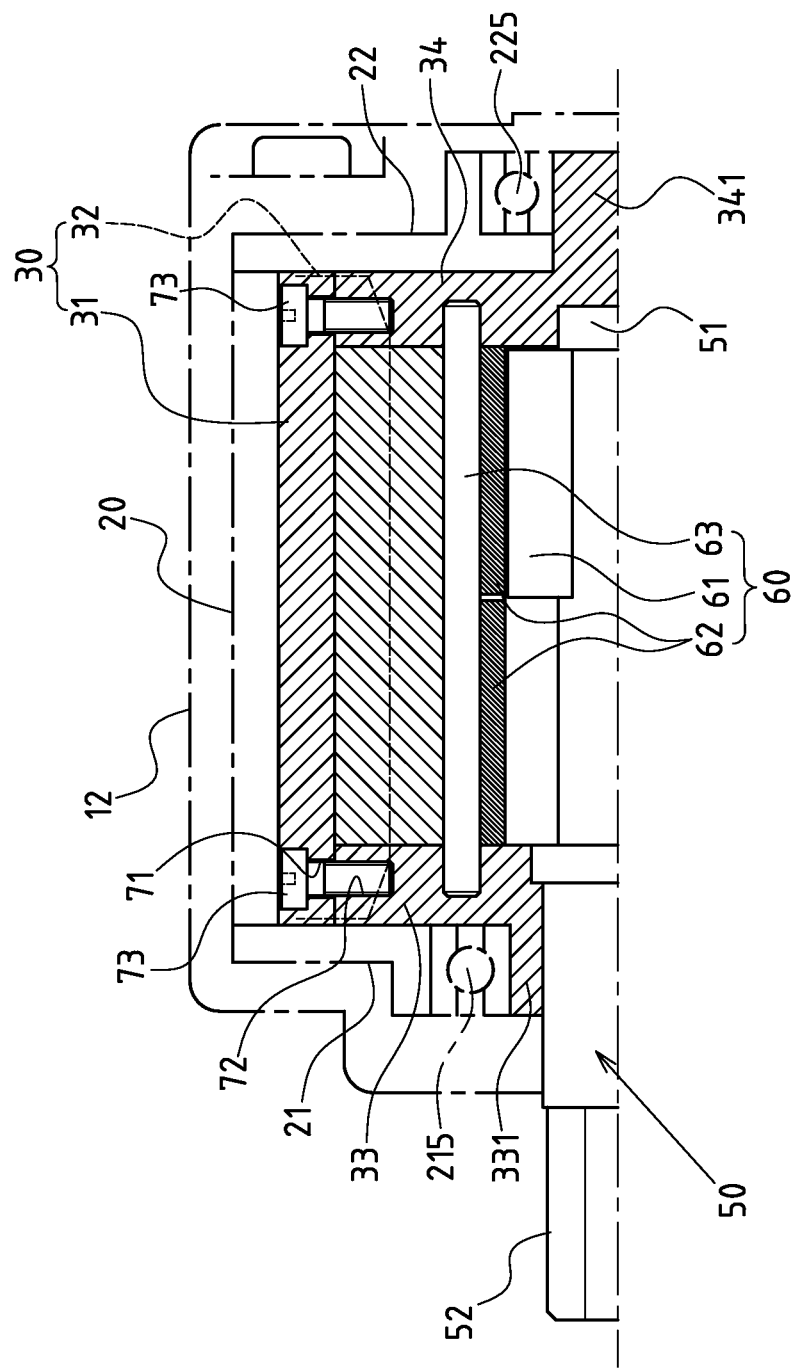
FIG. 5 is a schematic view of another preferred embodiment of the present invention showing the screwing state of the rotary drum and the front/rear panels.

As for the rotor set 30 with rotary drum 31 and flexible blades 32, the locking hole 71 and screw hole 72 are set correspondingly between the rotary drum 31 and its front/rear panels 33, 34 for screwing securely by bolts 73. Of which, said bolts 73 are screwed axially or radially. Referring to FIG. 2, said bolts 73 are screwed axially. Referring also to FIG. 5, said bolts 73 are screwed radially. Alternatively, said bolts 73 are screwed globally or partially by interpolation of pins 74 (marked in FIG. 2).

Of which, said pneumatic tool 10 is a pneumatic spanner, which allows the pneumatic motor A to be transversely set on top of the handle 11. The axial direction of the output shaft lever 50 is staggered in relation to or set in a direction perpendicular to the extension of the handle 11.

Based on the above-specified structural design, the present invention is operated as follows:

Referring to FIG. 3, said pneumatic tool 10 is activated in a way that the user could open the inlet channel 111 by pressing the switch 113, and air pressure (indicated by W) is guided into the reservoir 23 in the cylinder 20 of the pneumatic motor A. This could drive the rotation of the flexible blades 32 of the rotor set 30 along with the rotary drum 31, and air pressure is then released from the exhaust channel 112, forming the pneumatic operating path of the pneumatic tool 10.

Figure 6:
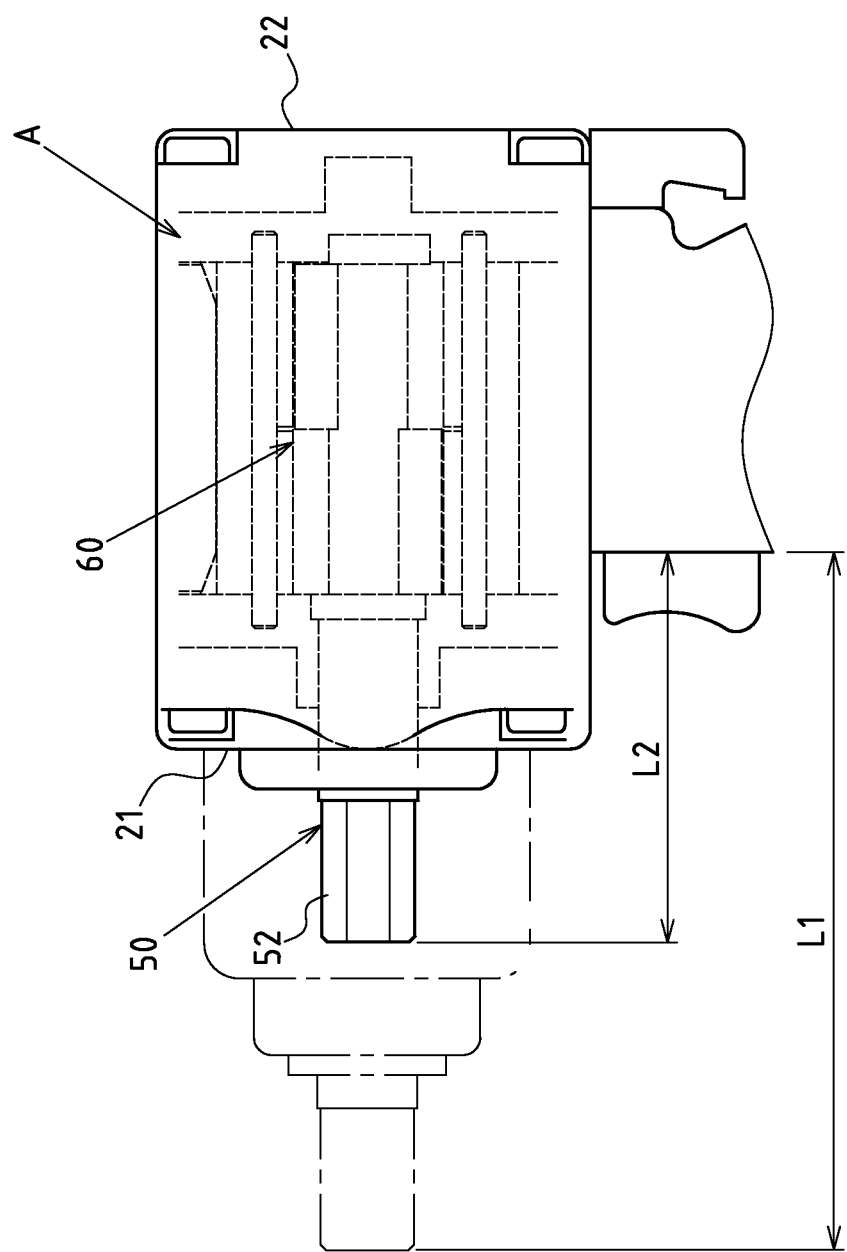
FIG. 6 is a schematic view of the present invention wherein the axial length of the pneumatic motor is shorter than that in prior art.

The core aspect of the present invention lies in its spatial pattern and technical characteristic wherein a chamber 40 is formed in the rotary drum 31 of the rotor set 30 to accommodate the striker mechanism 60. With this design, the rotary drum 31 of the rotor set 30 is taken as the framework of the built-in striker mechanism 60, whilst the driving slot 315 set on the lateral wall of the chamber 40 of the rotary drum 31 is used for driving the strut 63 and built-in striker mechanism 60. Hence, the "front reversing enclosure" in the prior art could be eliminated, thus reducing markedly the axial length and volume of the pneumatic motor and shrinking the volume of related components. Referring to FIG. 6, the section marked by L1 refers to the installation portion of the striker mechanism of conventional pneumatic tool and the protruding length formed therein. The section marked by L2 refers to the protruding length formed by the built-in striker mechanism 60 adopted by the pneumatic tool of the present invention. It can thus be seen that the protruding length of the present invention's pneumatic tool at front of the handle is reduced by about 3-5 cm (depending on the dimension of the pneumatic tool).

Of which, more than five flexible blades 32 are set on the rotary drum 31 of the rotor set 30. The quantity of the flexible blades 32 is determined by the technical characteristics of said built-in striker mechanism 60. In the prior art, at most six flexible blades are set on the rotor set of of conventional pneumatic tool. However, as a chamber 40 must be formed in the rotary drum 31 of the rotor set 30 to accommodate the built-in striker mechanism 60 in the present invention, the radial height of the flexible blades 32 set externally on the rotary drum 31 must be reduced slightly to meet the maximum space requirements of the chamber 40. With the reduction of the radial height of the flexible blades 32, the protruding height is shortened, leading to larger disparity of the air compression space's length to height ratio. So this problem could be resolved by adding the quantity of the flexible blades 32. On the other hand, as the reduction of the radial length of the flexible blades 32 may lead to smaller air compression space, the axial length of the flexible blades 32 could be properly prolonged to resolve this problem.

Figure 7:
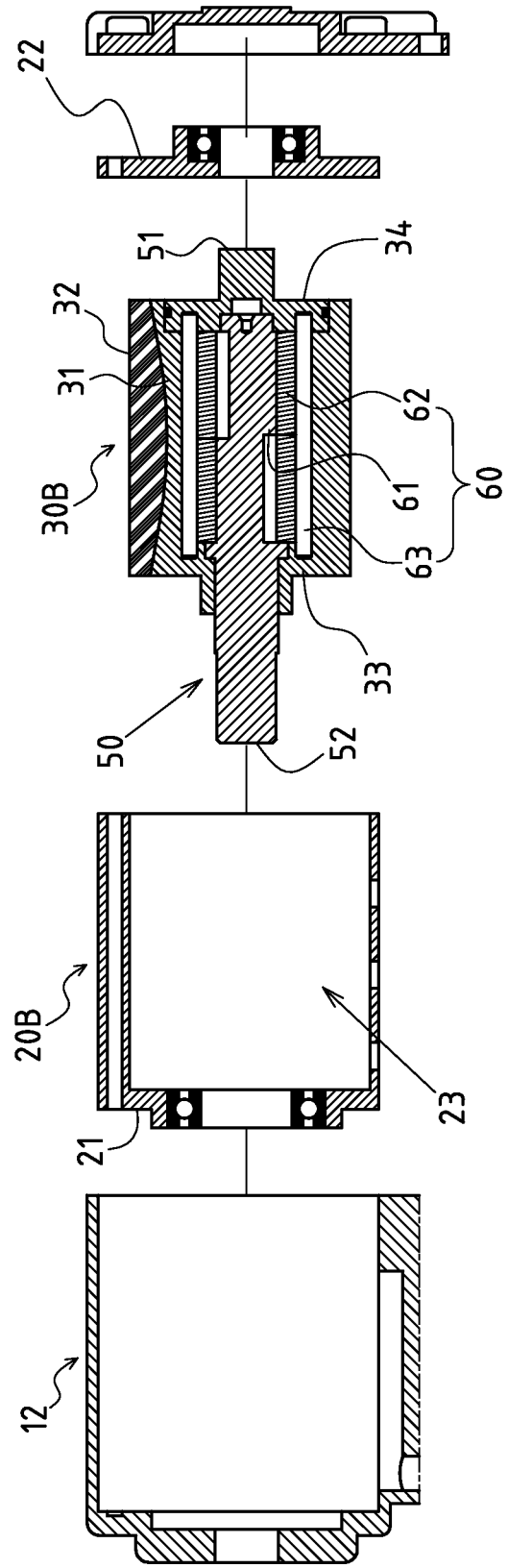
FIG. 7 is an exploded sectional view of another preferred embodiment of the present invention showing the structural pattern of the cylinder and rotary drum.
Figure 8:
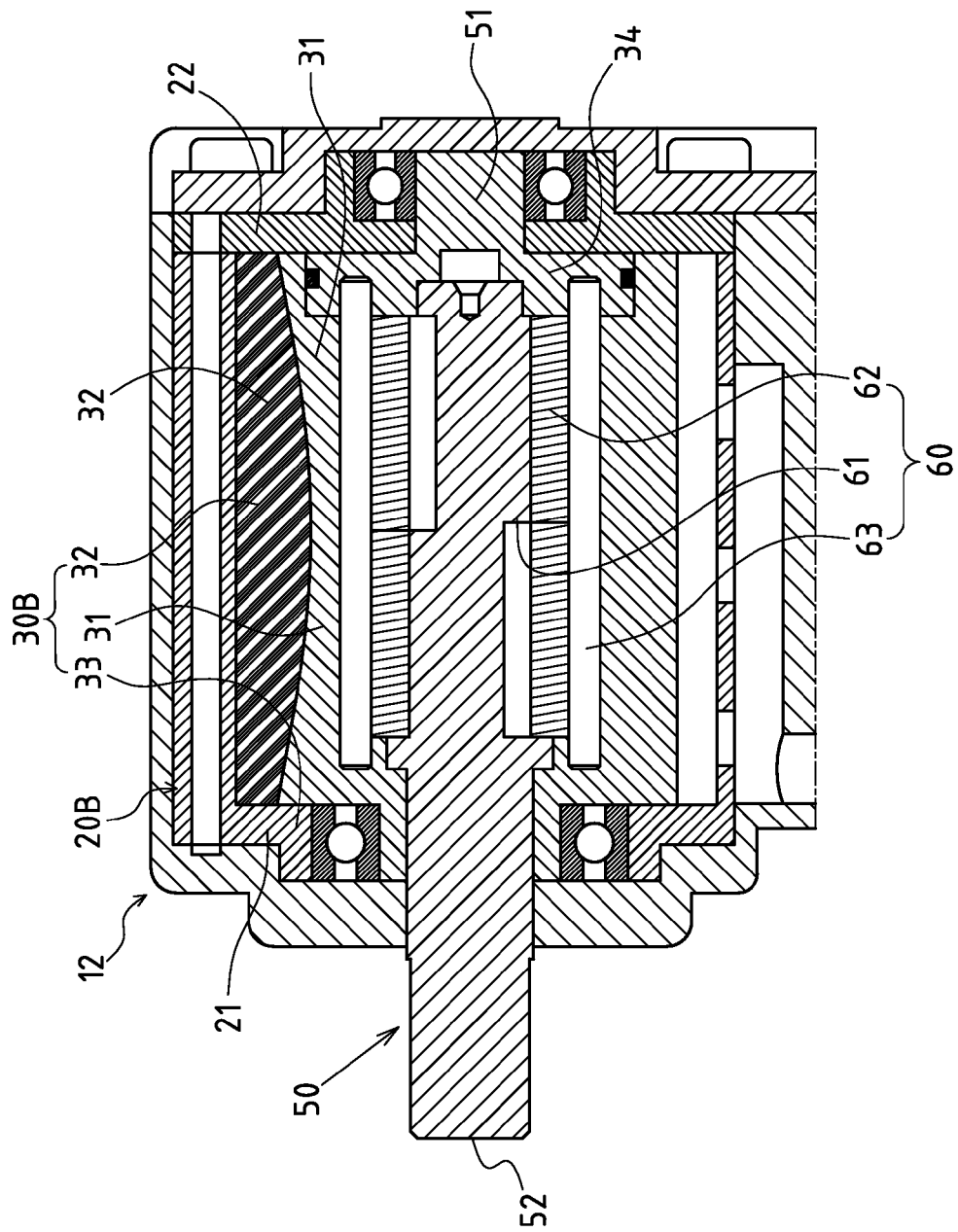
FIG. 8 is a combined sectional view of another preferred embodiment of the present invention showing the structural pattern of the cylinder and rotary drum.

Referring also to FIGS. 7, 8—another preferred embodiment of the cylinder and rotary drum, the cylinder 20B and the front wall 21 (or rear wall 22) are prefabricated, or the cylinder, the front and rear walls are prefabricated, and a removable assembly portion is formed on the cylinder. This differs from FIG. 1 wherein the cylinder 20 and the front/rear walls 21, 22 are screwed securely. As for the rotor set 30B in the preferred embodiment, the rotary drum 31 and the front panel 33 (or rear panel 34) are prefabricated; this differs from FIG. 1 wherein the rotary drum 31 of the rotor set 30 and the front/rear walls 21, 22 are screwed securely. Besides, the cylinder 20B and the front wall 21 or rear wall 22, or the rotary drum 31 and the front panel 33 or rear panel 34 could be assembled securely by bolting or by abutting, and then located finally by the locking of the end wall of the main body 12. Or, the rotary drum of the rotor set and the front/rear panels are integrally assembled, and then a removable assembly portion is formed on the rotary drum.

I claim:

1. An apparatus comprising:
   a pneumatic tool having a main body formed at one end of a handle of said pneumatic tool, said handle having an inlet channel and an exhaust channel and a switch, said switch controlling an on-off state of said inlet channel;
   a cylinder having a front wall and a rear wall and a reservoir located internally of said cylinder, said front wall having a front bearing, said rear wall having a rear bearing;
   a rotor set rotatably mounted into said reservoir, said rotor set having a rotary drum and multiple flexible blades positioned in spaced relation to each other on a peripheral wall of said rotary drum, said rotary drum having a front panel and a rear panel, said front panel having a front convex shaft positioned at a center thereof, said front convex shaft screwed onto said front bearing, said rear panel having a rear convex shaft positioned at a center thereof, said rear convex shaft screwed onto said rear bearing, said multiple flexible blades having external ends shiftably abutting an inner wall of said reservoir;
   a chamber formed into said rotary drum;
   an output shaft lever having a driven end and an outer shaft end and a striking portion located between said driven end and said outer shaft end, said driven end positioned on said rear panel of said rotary drum, said output shaft lever driven simultaneously with said rotary drum, said outer shaft end penetrating said front convex shaft and extends out of said front end of said main body of said pneumatic tool, said striking portion positioned in said chamber of said rotary drum;
   a striker mechanism positioned into said chamber, said striker mechanism having at least one striking bolt protruding on said striking portion of said output shaft lever and at least one movable hammer sleeved externally on the striking bolt and at least one strut axially positioned between said front panel and said rear panel of said rotary drum so as to support said movable hammer, said chamber having a relief portion for a motion of said movable hammer; and
   at least one driving slot recessed into a lateral wall of said chamber such that one side of the strut is driven simultaneously by said rotary drum.

2. The apparatus of claim 1, wherein a locking hole and a screw hole are positioned correspondingly between said rotary drum and said front panel or said rear panel, said locking hole and said screw hole are secured by bolts, said bolts being screwed axially or radially.

3. The apparatus of claim 1, said pneumatic tool being a pneumatic spanner, said pneumatic motor being transversely positioned on a top of said handle, an axial direction of said output shaft lever is staggered in relation to or positioned in a direction perpendicular to an extension of said handle.

4. The apparatus of claim 1, wherein said multiple flexible blades comprise five flexible blades positioned on said rotary drum.

5. The apparatus of claim 1, wherein said cylinder and said front wall or said rear wall are prefabricated, said cylinder having a removable assembly portion formed thereon.

* * * * *